Patented Mar. 21, 1933

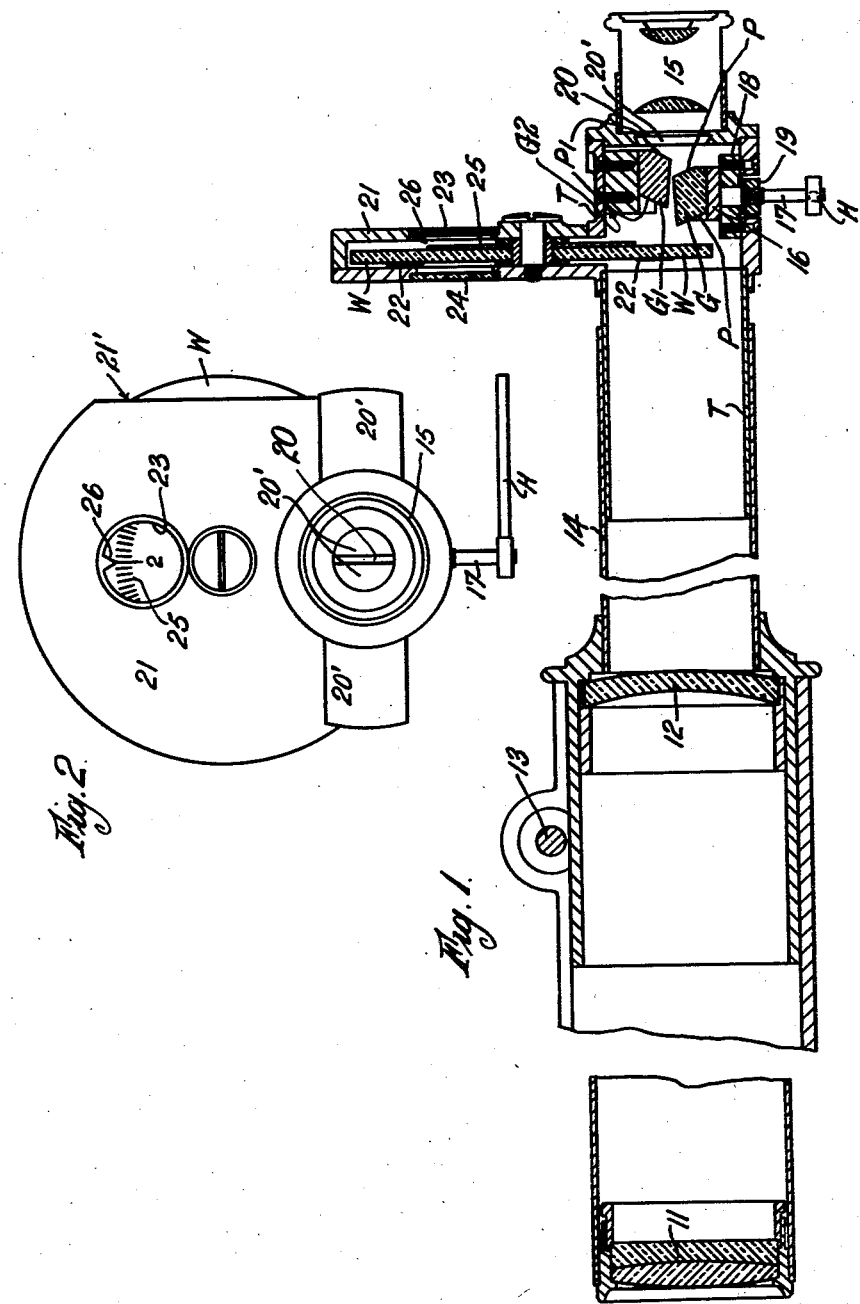

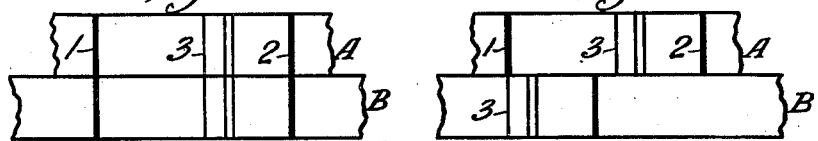
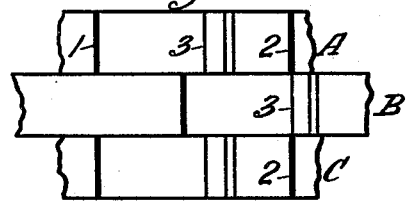
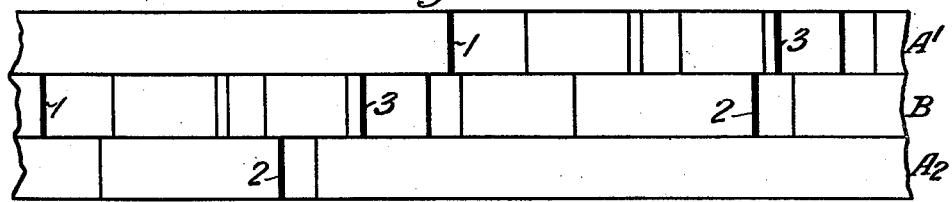
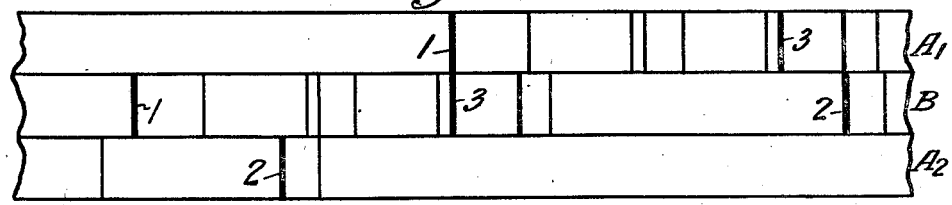
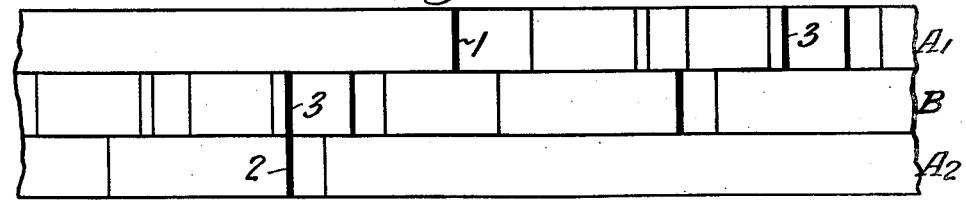

1,902,109

UNITED STATES PATENT OFFICE

FRANK TWYMAN, OF LONDON, ENGLAND, ASSIGNOR TO ADAM HILGER, LIMITED, OF LONDON, ENGLAND

METHOD OF AND APPARATUS FOR QUANTITATIVE SPECTRUM ANALYSIS

Application filed January 20, 1930, Serial No. 422,161, and in Great Britain June 11, 1929.

The subject of the present invention is an improved method of and apparatus for quantitative spectrum analysis of compounds, mixtures, alloys and the like. If a line spectrum of the material to be analyzed is produced in any suitable manner such as by an electric arc or spark it is known that the intensity of any particular line under defined conditons bears a definite relation to the proportion of the corresponding element in the material under investigation. The invention provides an improved means of ascertaining the relative proportion of an element in a specimen by comparing the intensity of a line corresponding thereto with that of a line corresponding to another element.

According to the invention in quantitative spectrum analysis spectrum parts are brought side by side and are relatively moved so as to bring predetermined lines into juxtaposition.

To effect a comparison of the intensities of the lines they are preferably equalized, for example, by interposing a tint wedge in the path of the line or lines of greater intensity.

Certain spectrum lines are unsuitable for the purposes of quantitative analysis, and of the remainder it is advantageous to choose those which differ in wave length by as small an amount as possible. It may occur, however, in some tests that the nearest suitable lines differ considerably in wave length. If sufficient dispersion is used to give adequate separation of the lines, a considerable relative movement of the spectrum parts is required and this may give rise to unequal loss of intensity in the spectrum parts to be compared. The further difficulty arises in visual observation of comparing light of different colours.

In accordance with the invention, therefore, one spectrum part may be divided into two sections, of different wave length ranges, which are disposed on either side of the other part, and as before a relative movement between the parts is made and the intensities of the lines to be compared are equalized. If required, the two sections may be relatively movable. By way of example, taking a line of about 5500 A in the undivided spectrum part, and assuming that the device for moving the spectrum parts relatively to each other is in its central or neutral position, this line will be opposite a line of, say, 4200 A in one section of the other part and a line of, say, 7100 A in the other section.

To overcome the difficulty of colour comparison in such cases this arrangement makes it possible after comparing, say, a line in the green with one in the red, to take a check test with the same setting comparing the same line in the green with one in the blue. The average of the two tests will give a more reliable result than either one singly.

In apparatus according to the invention means are provided for dividing the spectrum as set out above and in general, an eyepiece will be fitted to the apparatus to permit visual observation, but alternatively the apparatus may be adapted to be used with comparison means comprising photographic, photo-electric or thermal apparatus. In such cases comparison can be made between lines one or more of which may lie outside the visible spectrum.

The point at which the lines are compared will normally be the parts which are adjacent and where there is a risk of the lines not being of absolutely uniform intensity throughout their length, a better criterion of intensity can be obtained by comparing them at more than one place. This is achieved by separating one spectrum part perpendicularly to the spectrum and interposing between these two parts the movable spectrum part. There are thus two places where a particular line can be brought into juxtaposition with another one.

The accompanying drawings show by way of example an embodiment of apparatus according to the invention. Figures 1 and 2 are a sectional elevation and an end elevation respectively of apparatus according to the invention, the first figure being partly cut away. Figures 3 and 4 indicate the appearance of the spectrum in the apparatus of Figures 1 and 2, and Figures 5 to 8 indicate the appearance of the spectrum in such apparatus but having some of the modifications mentioned.

Figures 1 and 2 show the eye-piece end of a spectroscope with the usual telescope lenses 11 and 12 and a fixing clamp 13. In a tube 14, slides a tube T which forms a carrier for an actual eye-piece 15 and a deviating and light-adjusting means about to be described.

The deviating means comprises a block of glass G1 on a mount G2 screwed to the tube T. This block has parallel faces P1 set obliquely to the axis of the instrument so that the near face is observed as full of light to its lower edge. A rotatable block of glass G also has parallel faces P set obliquely to the axis of the instrument but in the opposite direction to the faces of the block G1. Moreover its top front edge is set farther back than the bottom front edge of the block G1 and the neighboring surfaces are slightly canted towards each other as shown. The effect of this arrangement is to obliterate the dividing line between the spectrum parts as viewed through the two blocks of glass and thus facilitate comparison of the density of lines.

The block G is rotatable about a vertical axis passing roughly through its center. For this purpose, it is mounted on a plate 16 fixed to the end of a rod 17. The rod 17 can rotate in the bearing mount 18 fixed by screws to the tube T and is held in place by a nut 19. On the lower end of the rod 17 a handle H is fixed which forms a convenient means for rotating the block G. To mask neighboring lines which may interfere with measurements, the field of view is limited to a slit 20 by shutters 20' movable towards or away from each other so as to vary the width of the said slit as described.

The light adjusting means in the construction shown, is a tint wedge. This is in the form of a circular glass disk W rotatable within a casing 21 attached to the tube T. The casing is open at one side as at 21' so that the disk may be rotated as described, by hand. On one side of the disk there is an annular coating of gelatine and pigment 22 graded to form a tint wedge. The disk is so mounted that the outer edge of this coating is at the optical axis of the apparatus. Thus the upper spectrum part is viewed through the tint wedge and the lower one through clear glass. Windows 23 and 24, opposite each other in the casing 21, render visible a scale 25 which is carried on the disk. This scale is read by a fixed pointer 26 and gives a measure of the reduction of the light by the tint wedge, and thus when the lines are matched of the relative intensity of the lines and accordingly of the relative amounts of the constituents concerned in the compound or mixture.

With the movable block in its central position the spectrum will appear as shown in Figure 3. Here A and B are the spectrum parts, 1 and 2 lines of an element present in known quantity in the sample and 3 a line of an element the quantity of which is to be determined. Figure 4 shows how the part B is shifted bringing line 3 of B into juxtaposition with line 1 of A. The part B may of course be shifted in the opposite direction.

Figure 5 shows the appearance of the spectrum in the case in which the apparatus is modified to separate one spectrum part perpendicularly to the slit. A and C are these parts and the figure shows part B shifted to bring line 3 of B into juxtaposition with line 2 of A and C, thus providing two points of comparison.

Figure 6 shows the appearance of a spectrum in which widely separated lines are to be compared. The spectrum part A is divided into two sections $A_1$ and $A_2$ disposed on either side of the part B so that with the rotating block in its central position the lines in juxtaposition differ considerably in wave length. By rotating the block line 3 in B is brought into juxtaposition with line 1 in $A_1$ as shown in Figure 7 and a check test is made as shown in Figure 8 where line 3 in B is brought into juxtaposition with line 2 in $A_2$.

I claim:—

1. The method of quantitative spectrum analysis which comprises bringing spectrum parts side by side, relatively shifting said parts to bring pre-determined lines into juxtaposition and equalizing the intensities of the said lines by a graduated reduction of the intensity of the brighter line.

2. The method of quantitative spectrum analysis which comprises producing a divided spectrum with parts disposed side by side, relatively shifting the parts to bring predetermined lines into juxtaposition and equalizing the intensities of the said lines by a graduated reduction of the intensity of the brighter line.

3. The method of quantitative spectrum analysis which comprises producing a divided spectrum with parts of different wave length ranges disposed side by side, relatively shifting the parts to bring pre-determined lines into juxtaposition and equalizing the intensities of the said lines by a graduated reduction of the intensity of the brighter line.

4. The method of quantitative spectrum analysis which comprises producing a spectrum divided into three parts disposed side by side, shifting the middle part relatively to the outer parts to bring pre-determined lines into juxtaposition and comparing the intensities of said lines by a graduated reduction of the intensity of one line to an intensity equal to that of the other.

5. The method of quantitative spectrum analysis which comprises producing a spec- -trum divided into three parts of different wave length ranges disposed side by side, shifting the middle part relatively to the outer parts to bring pre-determined lines into juxtaposition and equalizing the intensities of the said lines by a graduated reduction of the intensity of the brighter line.

6. Apparatus for quantitative spectrum analysis comprising spectrum producing means and associated therewith means for comparing predetermined lines as regards intensity, said comparing means comprising in combination a block of glass with parallel faces projecting part way into the light path of the spectrum producing means to divide the beam of light into two parts, a bearing supporting said block and having its axis approximately parallel to the spectrum lines, means for swiveling said block in said bearing, and a member of variable light absorbing power located in one of the separate light paths thereby produced.

7. Apparatus for quantitative spectrum analysis comprising spectrum producing means and associated therewith means for comparing predetermined lines as regards intensity, said comparing means comprising in combination two blocks of glass each with parallel faces and nearly adjacent each other on a plane roughly perpendicular to the spectrum lines, a bearing supporting one of said blocks and having its axis approximately parallel to the spectrum lines, means for swiveling the said block in said bearing, and a tint wedge movable in the light path passing through one of the said blocks.

8. Apparatus for quantitative spectrum analysis comprising spectrum producing means and associated therewith means for comparing predetermined lines as regards intensity, said comparing means comprising in combination a tube with an eye-piece, a block of glass with parallel faces disposed in said tube, a second block of glass with parallel faces mounted in said tube to be rotatable on an axis approximately parallel to the spectrum lines, said two blocks being nearly adjacent to each other on a plane roughly perpendicular to the spectrum lines, means for rotating the second block, and a tint wedge movable into the light path passing through one of the said blocks.

9. Apparatus as claimed in claim 7 in which the parallel faces of a block are set at an oblique angle to the plane between the blocks.

10. Apparatus as claimed in claim 8 in which the parallel faces of a block are set at an oblique angle to the plane between the blocks.

In testimony that I claim the foregoing to be my invention, I have signed my name this sixth day of January, 1930.

FRANK TWYMAN.